US012043049B2

(12) United States Patent
Bortolato

(10) Patent No.: US 12,043,049 B2
(45) Date of Patent: Jul. 23, 2024

(54) SYSTEM FOR TRANSFERRING BY SUBLIMATION GRAPHICAL IMAGES ON OBJECTS WRAPPED BY TRANSFER SUPPORTS AND PROCESS FOR REALIZING THE SYSTEM

(71) Applicant: Robert Bortolato, Carate Brianza (IT)

(72) Inventor: Robert Bortolato, Carate Brianza (IT)

( * ) Notice: Subject to any disclaimer, the term of this patent is extended or adjusted under 35 U.S.C. 154(b) by 634 days.

(21) Appl. No.: 17/413,004

(22) PCT Filed: Dec. 12, 2019

(86) PCT No.: PCT/EP2019/084817
§ 371 (c)(1),
(2) Date: Jun. 11, 2021

(87) PCT Pub. No.: WO2020/120655
PCT Pub. Date: Jun. 18, 2020

(65) Prior Publication Data
US 2022/0063316 A1 Mar. 3, 2022

(30) Foreign Application Priority Data
Dec. 14, 2018 (IT) ........................ 102018000011101
Jun. 12, 2019 (IT) ........................ 102019000008766

(51) Int. Cl.
*B41M 5/035* (2006.01)
*B41F 16/00* (2006.01)
*F27B 9/24* (2006.01)

(52) U.S. Cl.
CPC ........... *B41M 5/0358* (2013.01); *B41F 16/00* (2013.01); *F27B 9/24* (2013.01)

(58) Field of Classification Search
CPC ..... B41M 5/0358; B41F 16/00; B41F 16/008; F27B 9/24; F27B 9/2407; F27B 9/243;
(Continued)

(56) References Cited

U.S. PATENT DOCUMENTS 5,580,410 A * 12/1996 Johnston ............ B41M 5/38207 156/240
8,011,922 B2 * 9/2011 Checcucci ............ C23C 14/562 432/152
(Continued)

FOREIGN PATENT DOCUMENTS

| | | | |
|---|---|---|---|
| CA | 2528713 | A1 | 6/2007 |
| WO | 2007129210 | A2 | 11/2007 |
| WO | 2018158687 | A1 | 9/2018 |

OTHER PUBLICATIONS

International Search Report and Written Opinion for Corresponding International Application No. PCT/EP2019/084817 (Mar. 18, 2020) (16 pages).

*Primary Examiner* — Shawntina T Fuqua
(74) *Attorney, Agent, or Firm* — LUCAS & MERCANTI, LLP

(57) ABSTRACT

A system arranged to transfer graphical images on objects (8) wrapped into transfer supports (2) by sublimation. The system comprises an oven (12) comprising an inlet mouth (21) and an outlet mouth (23), at least one suction unit (14) located along at least one side of the oven (12), a plurality of hooking/unhooking components (50) located along at least one side of the oven (12) and arranged to hook/unhook the objects (8) wrapped by the transfer supports (2), at least one catenary (18) located along at least one side of the oven (12) and arranged to transport the objects (8) wrapped into transfer supports (2) from the inlet mouth (21) to the outlet mouth (23) of the oven (12) by way of the hooking/unhooking components (50). The system further comprises at least one separation wall (71), configured to keep separate a hot zone, in which the oven (12) is active and the hooking/unhooking components (50) are provided, from a cold zone in which the oven (12) is not working and the at least one the catenary (18) and the at least one suction unit
(Continued)

(14) are provided. Moreover, the system comprises a handling device (25) configured to move transversely to the inlet mouth (21) and to the outlet mouth (23) of the oven (12) the at least one suction unit (14), the at least one catenary (18) and the plurality of hooking/unhooking components (50) so that the separation wall (71) keeps separate the hot zone from the cold zone according to the dimensions of objects (8) wrapped by the transfer supports (2). The invention also concerns a method for realizing the system.

20 Claims, 9 Drawing Sheets

(58) Field of Classification Search
CPC .......... F27B 9/2438; F27B 9/042; F27D 3/12; F27D 2003/0063; B29C 65/56; B29C 65/72; B32B 37/10; B32B 37/02; B32B 37/14; B32B 38/14; B65C 9/06
See application file for complete search history.

(56) References Cited

U.S. PATENT DOCUMENTS

| | | | |
|---|---|---|---|
| 2008/0000579 | A1 | 1/2008 | Bortolato |
| 2017/0146296 | A1 | 5/2017 | Anping et al. |

* cited by examiner

SYSTEM FOR TRANSFERRING BY SUBLIMATION GRAPHICAL IMAGES ON OBJECTS WRAPPED BY TRANSFER SUPPORTS AND PROCESS FOR REALIZING THE SYSTEM

CROSS-REFERENCE TO RELATED APPLICATIONS

This application is a 371 of PCT/EP2019/084817, filed Dec. 12, 2019, which claims the benefit of Italian Patent Application No. 102018000011101, filed Dec. 14, 2018 and Italian Patent Application No 102019000008766, filed Jun. 12, 2019.

TECHNICAL FIELD

The present invention relates, in general, to a system for transferring by sublimation graphical images on an objects wrapped by transfer supports.

The invention also relates to a process for realizing the system.

In particular, the present invention relates to a system comprising an oven arranged to transfer graphical images by sublimation on elongated objects.

BACKGROUND ART

Systems are known for hot transferring by way of a sublimation process graphical images on objects, preferably on elongated objects.

In general, the systems are configured so that a support comprising graphical images to be transferred (transfer support) is wrapped around the object and is made to adhere to the object by applying vacuum between the support and the object. In this way it is possible to carry out the hot transfer of graphical images from the support to the object by sublimation.

Known systems, in general, comprise at least devices for hooking and unhooking objects wrapped into supports, devices for applying vacuum between supports and objects, devices for conveying wrapped objects and a horizontal or vertical oven in which it is provided that the various devices and objects wrapped into the supports pass through to obtain the hot transfer of graphical images from supports to objects by sublimation.

Applicant has noted that, in general, in the known systems it is provided that all the above cited devices are conveyed inside the oven during the sublimation process.

The technical solution generally provided and accepted in the known art involves inserting and heating in the oven the objects wrapped by or into the supports as well as all the devices that allow the transport of the objects, even if they do not directly participate to the sublimation process.

Moreover, it cannot be disregarded that the devices, that do not directly participate to the sublimation process, due to the fact that they are inserted into the oven, have the problem to be made of materials resistant to sublimation temperatures and therefore of materials having valuable characteristics.

In summary, Applicant has noted that the known art continues on providing systems that are not able to effectively solve the problems described above of the known art.

DISCLOSURE OF THE INVENTION

The object of the present invention is thus to solve the outlined above problems.

The above object is achieved by way of the system for transferring graphical images by sublimation on objects wrapped by transfer supports as claimed.

The present invention also relates to a process for realizing the system as claimed.

The present invention also relates to a suction device or unit, a semi-automatic hoking device and a semi-automatic or automatic unhooking device of objects wrapped by respective supports and other devices as described in the following disclosure.

Claims are an integral part of the teaching of the present invention.

The following summary of the invention is provided in order to provide a basic understanding of some aspects and features of the invention.

This summary is not an extensive overview of the invention, and as such it is not intended to particularly identify key or critical elements of the invention, or to delineate the scope of the invention. Its sole purpose is to present some concepts of the invention in a simplified form as a prelude to the more detailed disclosure that is provided herein below.

According to a feature of a preferred embodiment, the system comprises an oven, a separation wall, configured to keep separate a "hot zone", wherein the oven is active and hooking/unhooking components are provided, and a "cold zone", wherein the oven is not active and the catenary and the suction unit are provided. The system further comprises a handling device configured to move at least the suction unit and the catenary transversally to the oven so that the separation wall is arranged to keep separate the "hot zone" from the "cold zone" as a function of the size of the objects wrapped by the transfer supports.

According to a further feature of present invention, the oven, comprised in the system, in a zone below the objects comprises one or more pipes configured to convey hot air to the lower area of the "hot zone" and movable sheets connected to the handling device and arranged to be moved so as to limit the "hot zone" according to the size of objects wrapped by the transfer supports.

According to another feature of the present invention, the system comprises in the "cold zone" a sealing gasket made of deformable material that is resistant to temperatures lower than those of sublimation.

BRIEF DESCRIPTION OF DRAWINGS

These and further features and advantages of the present invention will appear more clearly from the following detailed description of preferred embodiments, provided by way of non-limiting examples with reference to the attached drawings, in which components designated by same or similar reference numerals indicate components having same or similar functionality and construction and wherein.

For the sake of clarity, Applicant reports that in the present description terms such as: upper, lower, longitudinal, orthogonal, transverse, lateral, above, below, vertical, horizontal, etc. are used in their conventional meaning, unless otherwise suggested.

BEST MODES FOR CARRYING OUT THE INVENTION

Figure 1A:
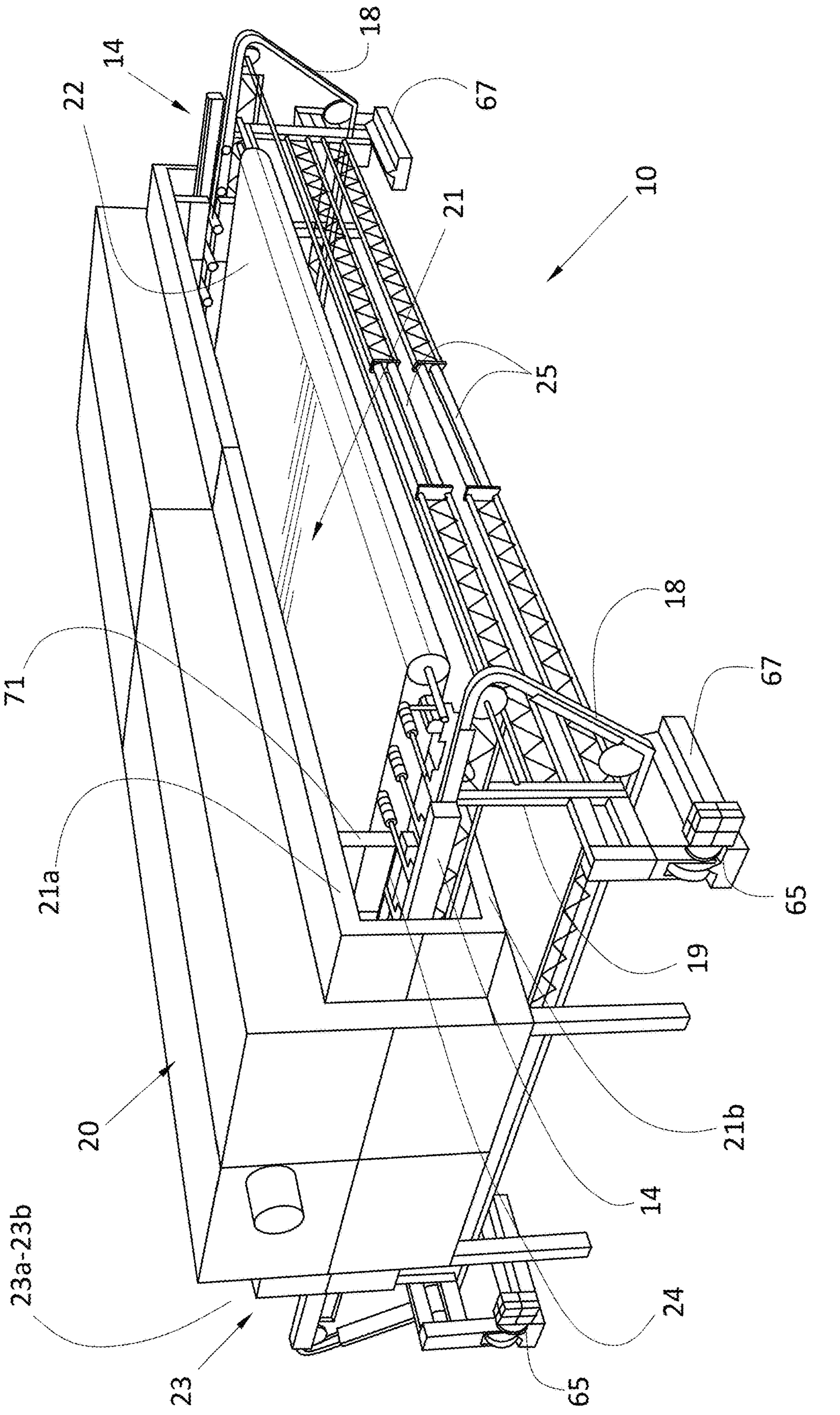
FIG. 1*a* schematically shows an axonometric view of a system for transferring graphical images on an object by sublimation according to a first embodiment.

With reference to FIG. 1*a*, a system 10, configured for transferring by sublimation graphical images reported on a respective transfer support or paper 2 on a preferably elongated object 8 (FIG. 1*a*, FIG. 2, FIG. 3*a*, FIG. 3*b*), comprises an oven 12, preferably in a central position and, on the sides of the oven, respectively, suction units 14, hooking/unhooking devices 15, facing each other, and side catenaries 18, for example arranged on a vertical or substantially vertical plane, supported by respective catenary supports 19.

Catenaries 18 are configured so as to transport the objects 8 wound into the transfer supports 2 along the oven 12, when they are hooked to hooking/unhooking components 50 comprised in the hooking/unhooking devices 15 of the system 10.

The oven 12, preferably, is a horizontal oven comprising respective inlet and outlet mouths, 21 and 23, and a conveyor belt or belt 22 for transporting the objects 8. The belt, for example a glass-filled Teflon (PTFE) belt, is preferably arranged on a horizontal or substantially horizontal plane and in central position as to a supporting frame 20, that is closed in an upper part of the same frame.

The oven 12 further comprises, preferably in an upper zone 27*a*, one or more heating components 31 configured to heat air to one or more predetermined temperatures.

Preferably, the oven further comprises one or more fans 33 and one or more pipes 35 configured to convey the heated air to a lower area 27*b* of the oven 12, underlying the belt 22, so as to allow the transfer of the graphical images from the transfer supports 2 to the objects 8 by heating from below.

Figure 1B:
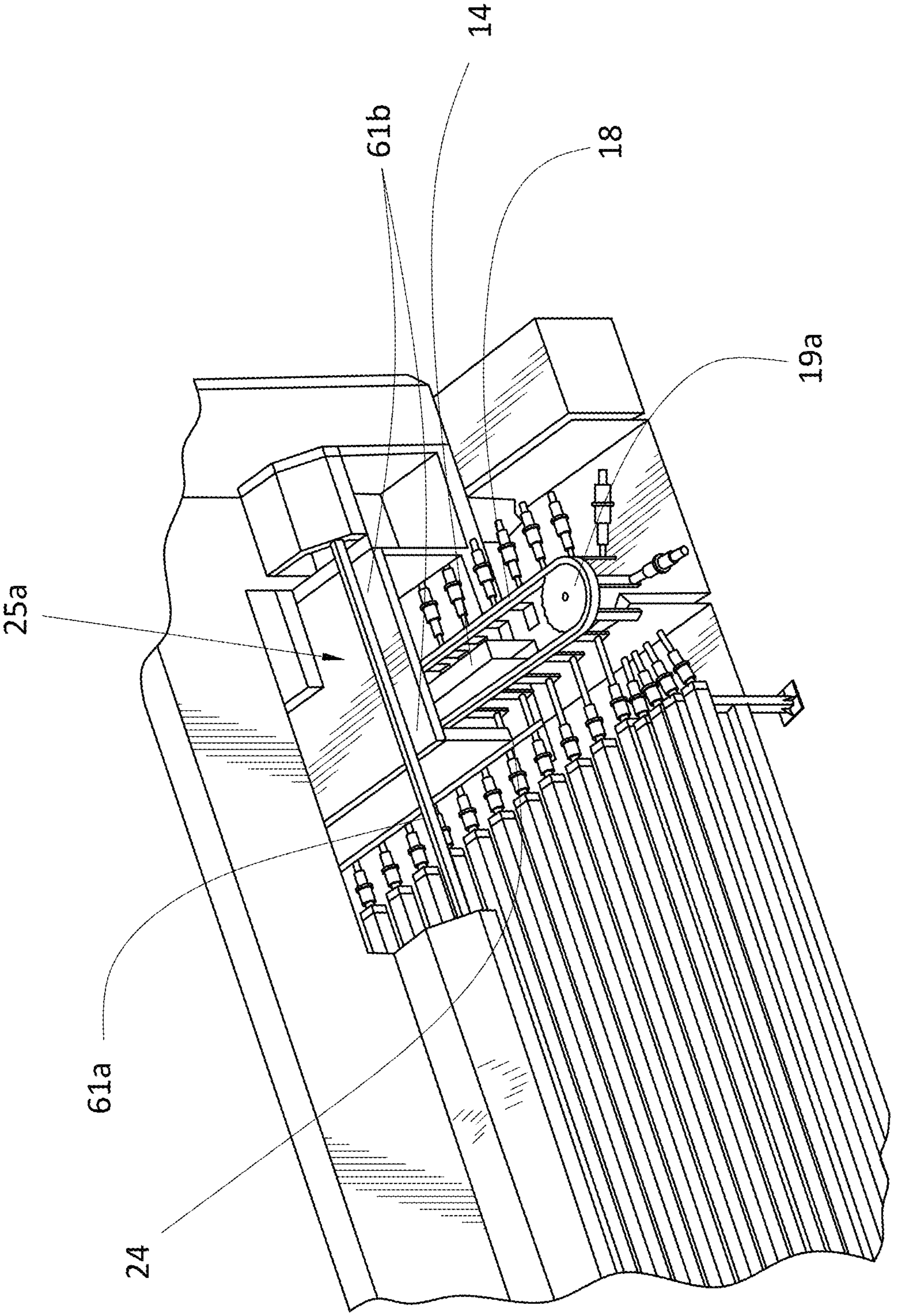
FIG. 1*b* schematically shows an axonometric partial view of a system for transferring by sublimation graphical images on an object according to a second embodiment.
Figure 1C:
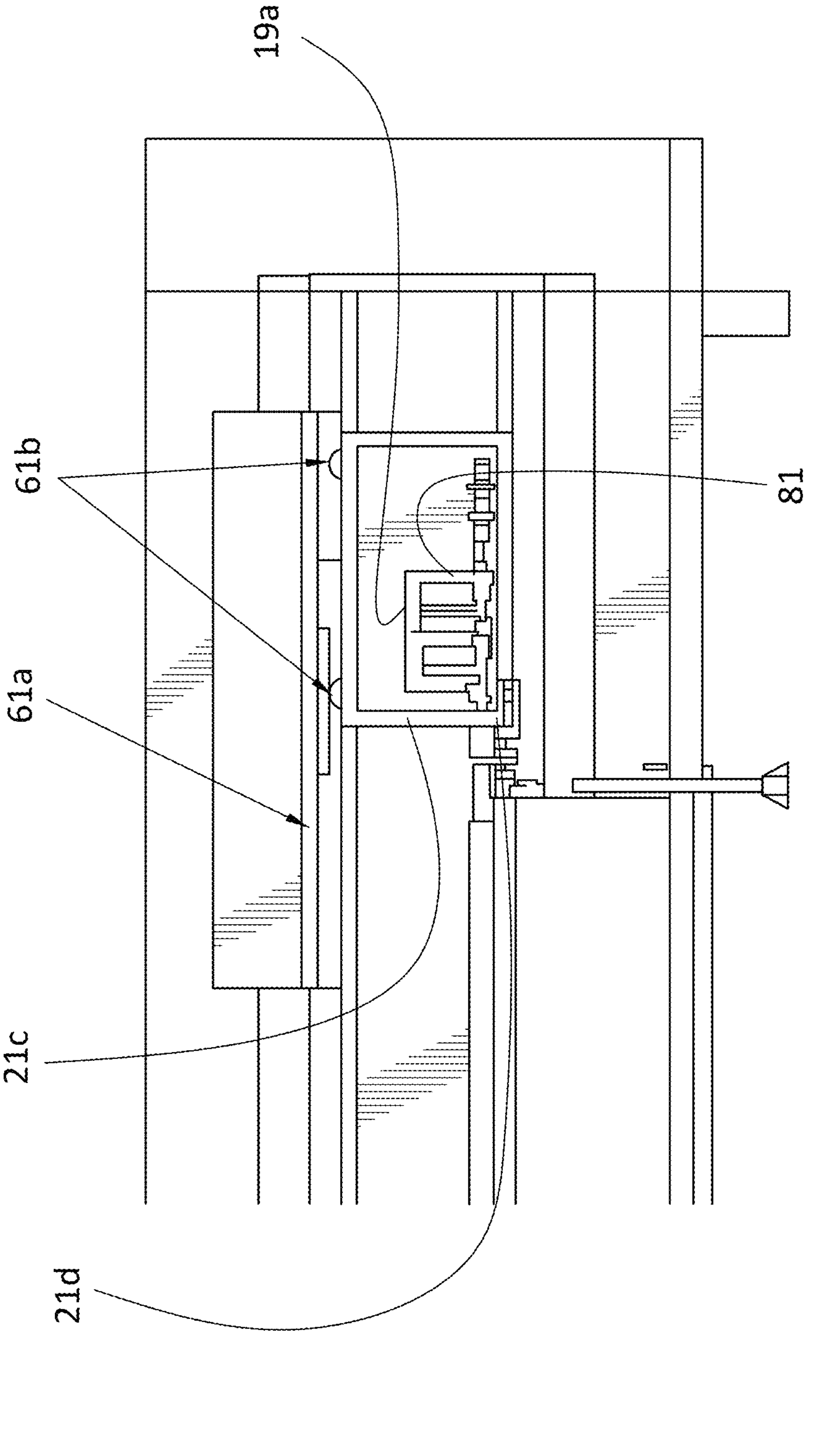
FIG. 1*c* schematically shows a partial view in section of the system of FIG. 1*b;*

According to a first and a second embodiment, shown in FIGS. 1*a*, 1*b* and 1*c*, the system 10 comprises, at each mouth, 21 and 23, of the oven 12, "U-shaped" and "inverted U-shaped" elements, 21*a*-21*b* and 23*a*-23*b*, comprising vertical arms 21*c*-21*d*, facing each other and arranged to provide separating walls 71 between the hooking/unhooking devices 15 and, at least, the side catenaries 18 and the suction units 14.

Figure 2:
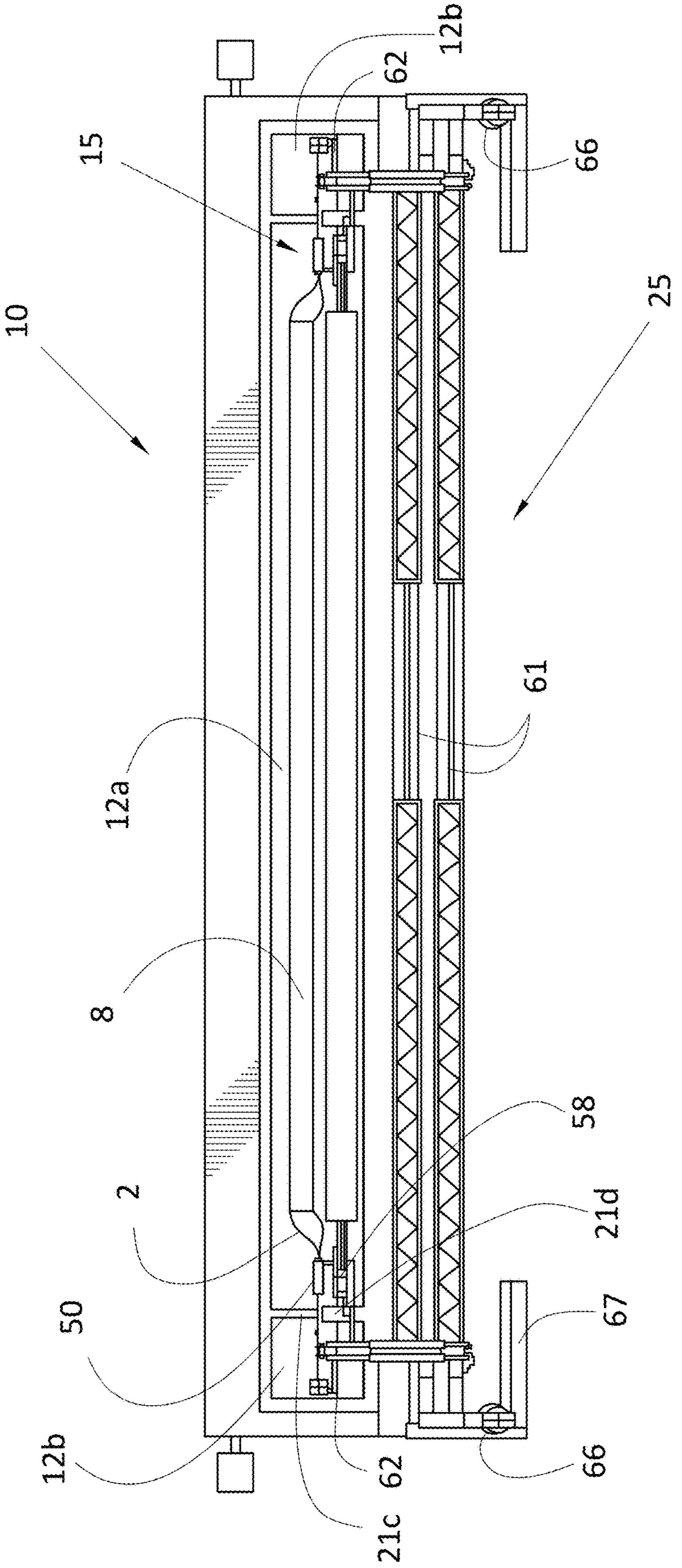
FIG. 2 schematically shows a front view of the system of FIG. 1*a;*
Figure 3A:
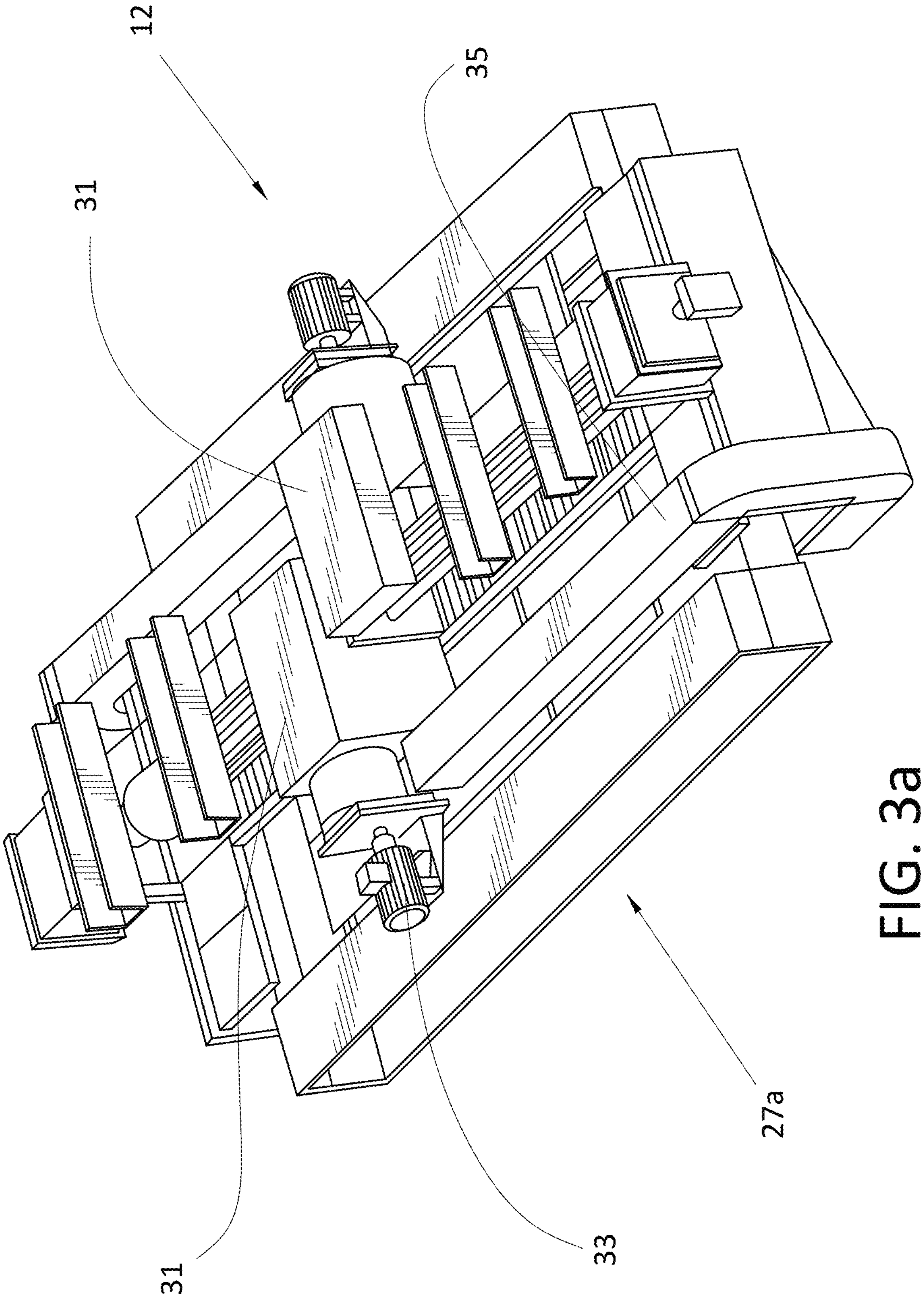
FIG. 3*a*-3*b* schematically shows an example of an oven comprised in the system.
Figure 3B:
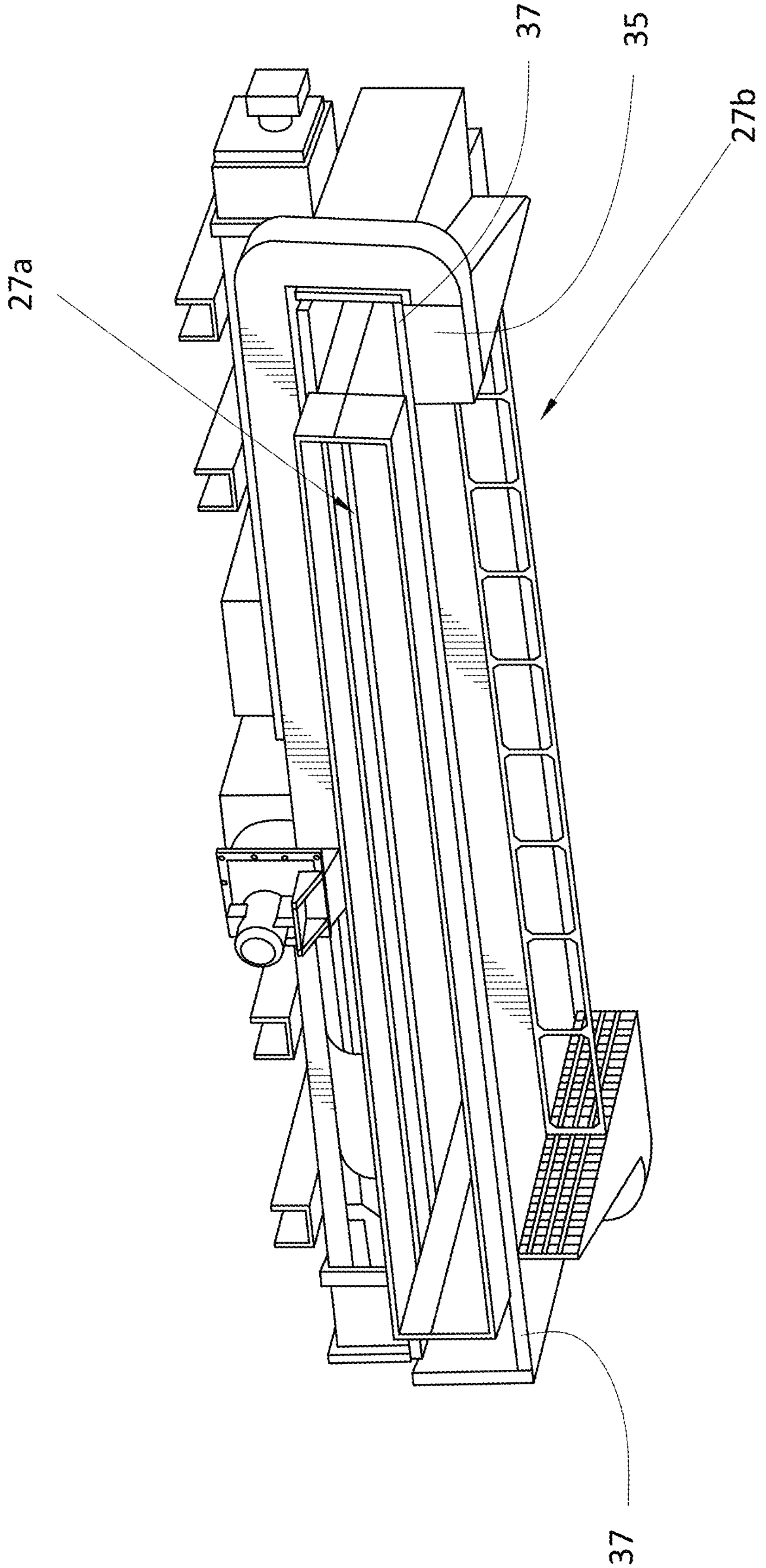

In the example of FIG. 1*a* and FIG. 2 the vertical arms facing each other on the oven sides are indicated with the numerical references 21*c*-21*d*, but equivalent vertical arms are also provided, preferably, on the oven sides at the outlet mouth 23.

Between the vertical arms, 21*c*-21*d*, it is provided a vertical empty space (spacing or gap) 24, of predetermined width, configured to let hollow tubular elements 51 (FIG. 1*a*-FIG. 6*c*) pass through the gap 24. The hollow tubular elements 51, are fixed to driving elements 81 comprised in the catenaries 18 and comprising at a first end 51*a* the hooking/unhooking components 50 facing each other.

Preferably, according to the first embodiment (FIG. 1*a*, FIG. 2), it is provided that the separating walls 71, i.e. the vertical arms 21*c*-21*d* are fixed and configured to keep a central "hot" zone or sublimation zone 12*a* separated from two "cold" side zones or drive and suction zones 12*b* in which the oven 12 is not provided to convey hot air. Moreover according to the firs embodiment it is provided that the vertical spacing 24 is arranged to allow the connection of the hooking/unhooking components 50 to the catenary 18 and to the suction group 14 while maintaining the "hot" zone separated from the "cold" zones.

In particular, according to this first embodiment the suction units 14 and the catenaries 18 are positioned in the "cold" zones 12*b* and the hooking/unhooking components 50 are positioned in the "hot" zone 12*a*, preferably on opposite sides.

According to the first embodiment, it is provided that the suction units 14, and the catenaries 18, together with the hooking/unhooking components 50, fixed to the driving elements 81 comprised on the catenaries 18, can be moved as to the vertical arms, 21*c*-21*d*, and to the belt 22, by way of a handling device 25 connected to the supports 19 of the catenaries 18.

Even more in particular, according to this embodiment it is provided that the handling device 25 is located in the system 10 at the inlet and outlet mouths, 21 and 23, of the oven 12 and that it comprises arms 61, for example telescopic arms, arranged to move the supports 19 of the catenaries 18 transversally to the inlet and outlet mouths, 21 and 23, of the oven, for example, by way of side motors 65 and side wheels 66 arranged to slide on support surfaces 67 comprised, preferably, in the supporting frame 20.

According to this embodiment, the arms 61 are connected to the supports 19 of the catenaries 18 and the supports 19 are in turn connected, for example by way of suitable brackets 62, to the suction units 14.

In particular, according to a version of this embodiment, it is provided that in the lower area 27*b* the oven 12 comprises, on opposite sides of the "hot" zone 12*a*, movable sheets 37, for example horizontal sheets, connected to the handling device 25 and suitable to be handled so as to limit the "hot" zone 12*a* according to the size of the objects 8 wrapped into the transfer supports 2.

Advantageously, according to this version it is possible to suitably delimit the area in which the oven 12 introduces from underneath the hot air necessary to effect sublimation.

Preferably, it is provided that the movement of supports of the catenaries 19 is symmetrical as to the vertical arms, 21*c*-21*d*, and to the belt 22 whereby the oven 12 can homogeneously heat from underneath the "hot" zone 12*a* possibly delimited by the sheets 37 located in the lower area 27*b* of the oven 12.

With reference, in particular to FIGS. 1*b* and 1*c*, a second embodiment is schematically represented, in which elements indicated with numerical references, identical or similar to those of the first embodiment, indicate elements that in the second embodiment are identical or similar in functionality and construction to those of the first embodiment.

According to the second embodiment it is provided that the "inverted U shaped" and "U-shaped" elements 21*a*-21*b* and 23*a*-23*b*, arranged for realizing the separation walls 71 that delimit the hot zone 12*a* from the cold zone 12*b*, may be moved so as to optimize the dimensions of the hot zone 12*a* and of the cold zone 12*b* as a function of the dimensions of the objects 8 on which the transfer of the images by sublimation is required (FIGS. 1*b* and 1*c*).

In particular, according to this embodiment it is preferably provided that the side catenaries 18 are arranged on a horizontal or substantially horizontal plane, that they are completely enclosed in the cold zone 12*b* and that they are supported and guided, on the horizontal plane, by rotatable supports 19*a*, for example shaped in the form of circular sprocket wheels.

Even more particularly, in this embodiment it is provided that, at the inlet and outlet mouth, 21 and 23, of the oven a handling device 25*a* is comprised. Moreover it is provided that the handling device 25*a* comprises respective guides 61*a* in which supports 61*b* slide, preferably hooked, to the "inverted U-shaped" and "U-shaped" elements, 21*a*-21*b* and 23*a*-23*b*, and that the "inverted U-shaped" and "U-shaped" elements are connected, in turn, to the suction groups 14 connected, for example by way of appropriate brackets, to the rotatable supports 19*a*.

Figure 4:
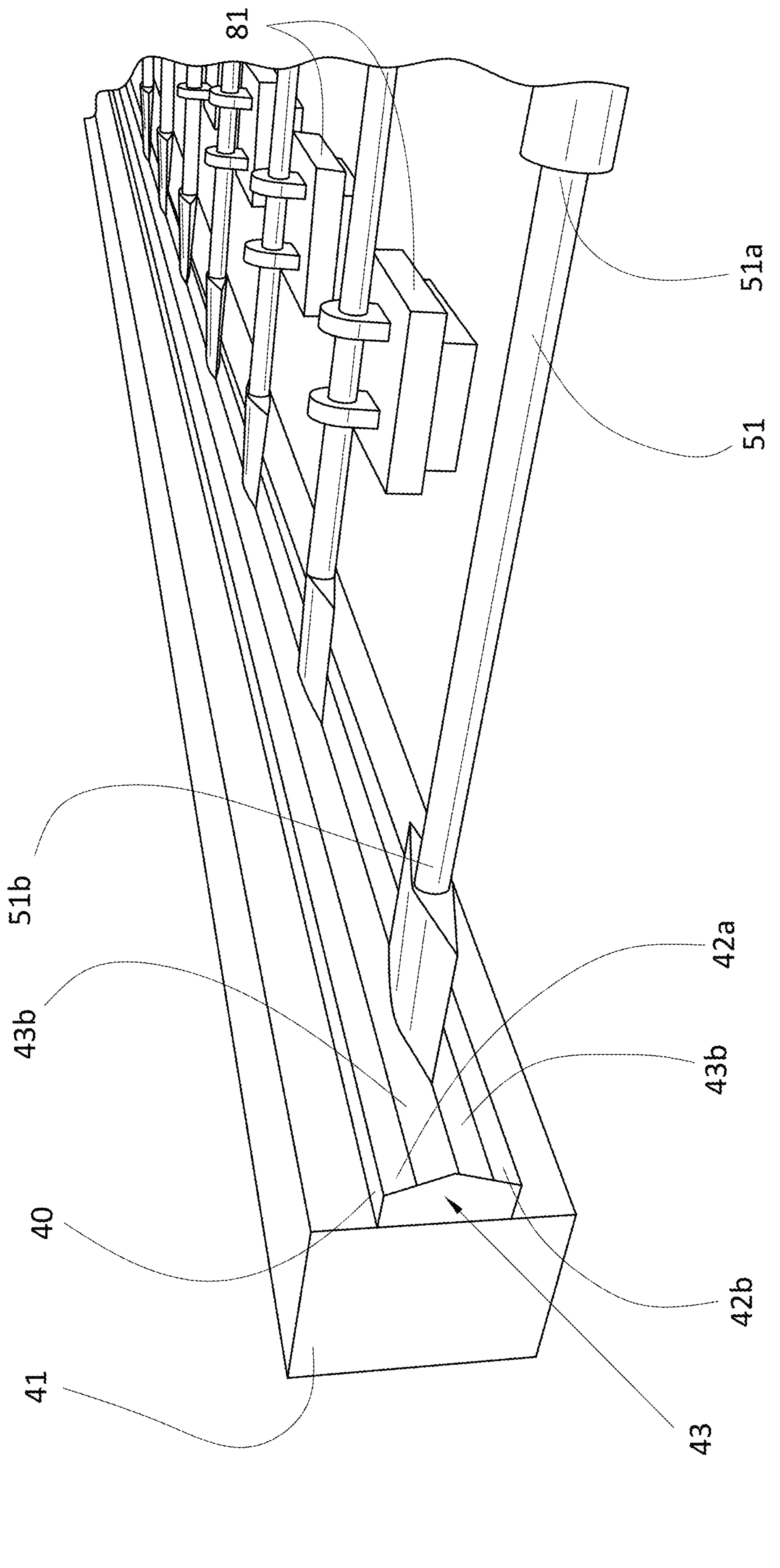
FIG. 4 shows the suction unit of the system in a partial axonometric view.
Figure 5B:
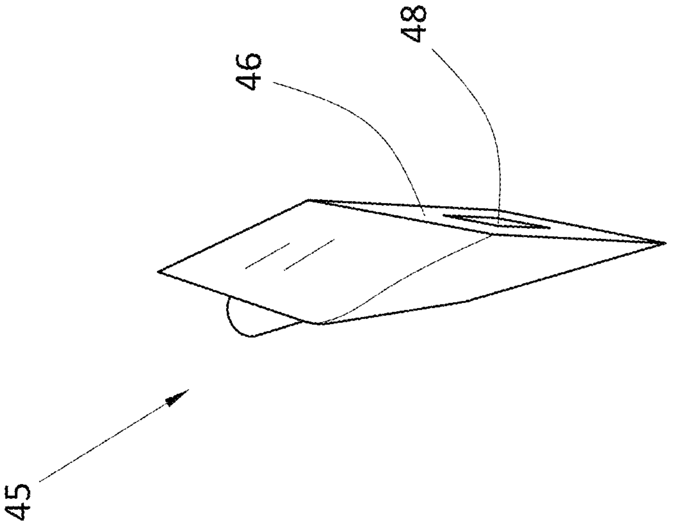
FIGS. 5*a*-5*b* show a suction component comprised in the system.
Figure 5A:
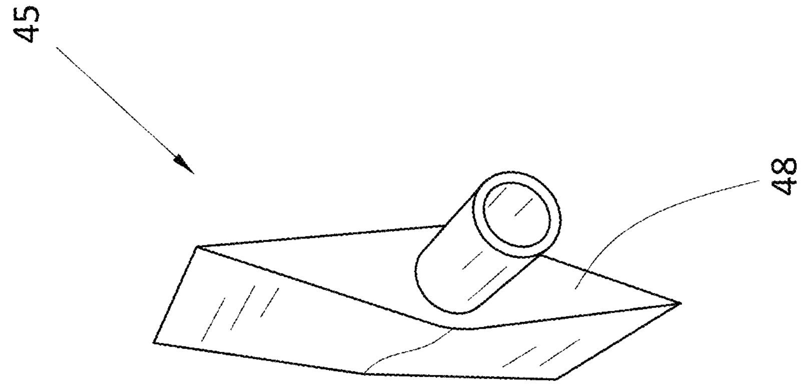
Figures 6A, 6B, 6C:
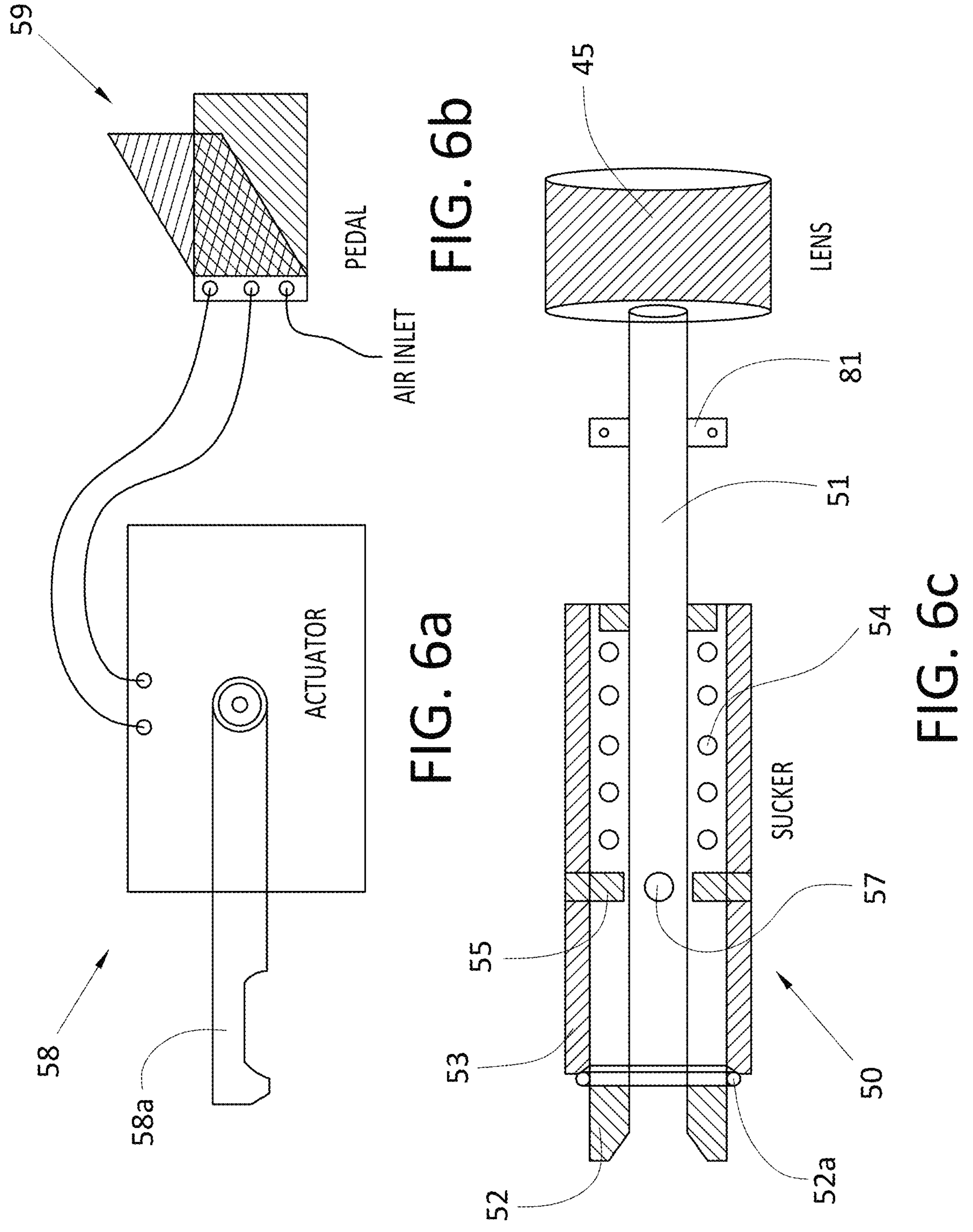
FIGS. 6*a*, 6*b*, 6*c* schematically show a hooking/unhooking device that can be used in the system.

According to this embodiment, the handling device 25*a* allows to move transversely to the inlet and outlet mouths, 21 and 23, of the oven the separating walls 71, the suction units 14, the side catenaries 18, supported by the rotatable supports 19*a*, and the hoking/unhooking devices 15, connected, for example, to the catenaries 18 by way of respective driving elements 81 substantially equivalent, by function, to those already shown and disclosed above with reference to FIG. 4.

Also in this second embodiment it is possible to provide that, in the lower zone 27*b*, the oven 12 comprises, on opposite sides of the "hot" zone 12*a*, the movable sheets 37 connected to the handling device 25*a* so as to limit the "hot" zone 12*a* depending on the size of the objects 8 wound into the transfer supports 2 and to appropriately delimit the area in which the oven 12 introduces from underneath hot air necessary to effect sublimation.

In summary, thanks to the disclosed configuration it is possible to move the separation walls 71 and accurately modify the dimensions of the hot zone 12*a* and of the cold zone 12*b* as a function of the dimensions of the objects 8 wrapped by the transfer supports 2 and optimize as a whole energy consumption and heat dispersion of the system 10.

Of course, as easily understandable by a person skilled in the art, according to a first possible variant, the second embodiment can be realized so that the dimensions of the hot and cold zone, 12*a* and 12*b*, cannot be modified while maintaining the catenary 18 arranged on a horizontal plane and, preferably, inside the cold zone 12*b*.

According to a further possible version, the second embodiment can be realized so that the movement of the separation walls 71 delimiting the hot zone 12*a* and the cold zone 12*b* can be realized by way of the handling device 25 as disclosed with reference to the first embodiment.

According to both embodiments and to the disclosed versions it is provided that, preferably, the width between hooking/unhooking components 50 facing the "hot" zone 12*a* can be varied by at least ±60 cm in a symmetrical manner leaving unchanged or not the width of the "cold" zone.

Naturally, according to further embodiments it is provided, as easily understandable by a technician in the field, that the movement operated by the handling device, 25 or 25*a*, is carried out asymmetrically as to the "hot" zone 12*a* in all the embodiments disclosed up to now and that the width of the variations may be higher or lower than that suggested, without departing from the scope of what has been disclosed and claimed.

The suction units 14 are configured to allow air to be sucked from the transfer supports 2 so as to make them adhere to the objects 8. The suction units 14 are preferably located on the sides of the oven 12, in the "cold" zones 12*b*.

The suction units 14 are preferably identical to each other so that, for simplicity of description, only one is disclosed here by taking into account that the other unit is identical and specular to that disclosed here.

Each suction unit 14 comprises an hollow elongated component 40, for example comprising a pagoda-shaped section, preferably fixed to an elongated support 41 comprising, for instance, a rectangular section. The hollow elongated component 40 is connected, in a known way, to a vacuum source and comprises, for example, two sides 42*a*, 42*b*, converging to each other and slightly inclined in the direction of the hollow tubular elements (tubular elements) 51, for example with angles comprised between 20°-45° as to a vertical plane.

Preferably each converging side, 42*a*, 42*b*, comprises a respective strip, 43*a*, 43*b*, made of deformable material, preferably coplanar to the converging sides.

The strips 43*a*, 43*b* comprise contacting ends and are configured so as to provide a sealing gasket 43 when, in use, the hollow elongated component 40 is put into suction by way of the vacuum source.

Preferably the strips 43*a*, 43*b* are configured so as to be elastically deformed by a suction or lens component 45 connected to a second end 51*b* of the hollow tubular elements 51 and arranged to automatically enter into the sealing gasket 43.

Even more preferably the suction components or lenses 45, for example made of stainless steel, comprise a front area 46, shaped as a thin rhomboid section, wherein the thin rhomboid section comprises for example a width or lower diagonal comprised between 3 and 7 mm, and a rear area 48, shaped as an enlarged rhomboid section, wherein the enlarged rhomboid section is connected to the front area 46 of the lens 45 and comprises, for example, a width or lower diagonal comprised between 20 and 30 mm.

The front area 46 of the lens 45 comprises one or more suction holes 47 and is configured to be automatically inserted and slide, in use, along the gasket 43 so as to deform the strips 43*a*, 43*b* and ensure that the gasket 43 remains peripherally self-sealed along the area in which the lens 45 is inserted.

The rear area 48 of the lens 45 is arranged to be fixed to the second end 51*b* of the hollow tubular elements 51.

In use, the front area 46 of the lens 45 being in communication with the rear area 48 and with the hollow tubular element 51 is arranged to suck air from the hooking/unhooking components 50 so as to create and maintain the vacuum between the support 2 and the object 8 and make as a consequence the support 2 adhere to the object 8.

Advantageously, since each suction unit 14 is located, according to the preferred embodiments, in the "cold" zones 12*b*, the gaskets 43 can be made of a material that maintains elastic characteristics at the same limited temperatures and cannot maintain their characteristics at sublimation temperatures. For example, gaskets 23 may be made of materials such as silicone, EPDM (Ethylene-Propylene Diene Monomer) or other synthetic or natural rubbers, that maintain their characteristics at temperatures lower than 200°. Materials that must maintain elastic characteristics at high temperatures as, for instance, those materials provided in the "hot" zone, wherein, for example, temperatures are not lower than about 260°, can be avoided.

The hooking/unhooking devices 15 comprise, according to preferred embodiments, a plurality of hooking/unhooking components 50, also named here suckers, configured to hook/unhook, in use, the transfer supports 2 wrapping the objects 8. Preferably, the hooking/unhooking devices 15 further comprise at the inlet and outlet mouth, 21 and 23, of the oven 12, respective side pairs of actuators 58.

According to the first embodiment, the hooking/unhooking devices 15 are of semi-automatic type and are configured to activate the hooking and unhooking of the objects 8 wrapped by the paper 2 through the intervention of operators positioned at the mouth inlet 21 and at the mouth outlet 23 of the oven 12, as will be disclosed in detail herein below with reference to the operation of the suckers 50 and of the actuators 58.

According to the second embodiment it is provided that the hooking/unhooking devices 15, next to the outlet mouth 23, are configured so as to guarantee a completely automatic unhooking of the objects 8 wrapped by the paper 2, as will be disclosed further on in detail with reference to the operation of the suckers 50 and of the actuators 58.

The hooking/unhooking components 50 comprise, according to the disclosed embodiments, an inner shell 52 fixed to the first end 51*a* of the tubular elements 51, by way of an O-ring 52*a*, and an outer shell 53 telescopically movable as to the inner shell 52.

Between the outer shell 53 and the tubular element 51 it is comprised a spring 54, preferably a cylindrical spring, arranged to exert pressure on a ring 55 fixed to the outer shell 53 and to allow movement of the outer shell as regards the tubular element 51 and the inner shell 52.

In particular, the ring 55 comprises a protruding element or pin 57 configured to allow the spring 54 to be compressed from outside, i.e. to make slide the outer shell 53 so that the inner shell protrudes and allows an operator to wrap the paper 2 on the inner shell 52.

The pairs of actuators 58 are configured to respectively activate hooking or unhooking of paper 2 to/from the hooking/unhooking components 50. The actuators preferably are of pneumatic type and comprise respective levers 58*a* that, for example in accordance with the first embodiment, are remotely controlled from an operator by way of one or more pedals 59, preferably located outside the "hot" area, for example on the floor.

The hooking/unhooking components 50 and the actuators 58 comprised in the hooking/unhooking devices 15 are preferably identical to each other so that, for simplicity of description, one is described here by only assuming that the suckers 50 are preferably fixed to the lateral catenaries 18 and provided for hooking/unhooking the transfer supports 2 comprising the objects 8 and that the actuators 58, preferably, are fixed to the elongated supports 40 of the suction devices 14, are in a limited number and provided only to respectively allow hooking/unhooking the transfer supports 2 to/from the suckers 50 before and after the "hot" zone 12*a* of the oven 12 in which sublimation takes place.

In use, in all the embodiments, it is provided that, near the inlet mouth 21, the lever 58*a* of the actuator 58, activated by the pedal 59, rotates from a rest position to a working position in which it is arranged to push the pin 57 so as to project the inner shell 52 and allow an operator to wrap the paper 2 onto the inner shell 52. Once the wrapping has been completed, it is also provided that the operator re-activates the pedal 59 so that the lever 58*a* returns to the rest position and the outer shell 53, pushed by the spring 54, blocks the transfer support or paper 2 between the inner shell 52 and the outer shell 53.

According to the first embodiment, it is also provided that, in use, at the outlet mouth 23, an operator drives, for example with the pedal 59, the lever 58*a* to the working position so as to make protruding the inner shell 52 and allow the operator to unhook the paper 2 from the inner shell 52 and to free the object 8 from the hooking/unhooking component 50.

According to the second embodiment it is provided, on the contrary, that in use, near the outlet mouth 23, the lever 58*a* of the actuator 58, controlled for example by a microswitch, is driven to the working position at the arrival of each hooking/unhooking component 50 so as to automatically unhook the paper 2.

Thanks to the presence of a bracket connected to the rotatable support 19*a* and arranged to keep the inner shell 52 protruding outwards, and to the fact that the catenary is arranged on a horizontal or substantially horizontal plane and rotates about a vertical or substantially vertical axis, the sucker 50 moves away from the paper 2 and from the object 8 by unhooking it. As a consequence, by remaining the inner shell 52 protruding, the paper 2 and the object 8, being unhooked from the sucker 50, rest on the belt 22.

In summary, according to the second embodiment, after the sublimation process the unhooking of the objects 8 wrapped by the paper 2 can be made completely automatic and do not require the presence of operators thanks, in particular, to the fact that the catenary 18 is arranged on a horizontal or substantially horizontal plane.

Of course, according to other embodiments, it is provided that the actuators 58 are not included in the hooking/unhooking devices 15 and that, consequently, the hooking/unhooking devices 15 only comprise the suckers without the actuators and that the suckers, for example, are manual type suckers.

The operation of the system 10 according to one or more of the disclosed embodiments is the following.

In some preliminary steps it is provided that the "hot" zone 12*a* of the oven 12 be sized appropriately by means of the handling device 25 or 25*a* so as to take into account, for example, the length of the objects 8 on which to carry out the transfer of graphical images or representations by sublimation.

The sizing in width of the "hot" zone is provided to ensure that the suction units 14 and the catenaries 18 are comprised in the "cold" zones 12*b*.

In the preliminary steps it is also provided that the oven 12 is brought to the working or sublimation temperature, for example 260°, that the lateral catenaries 18 are activated together with the belt 22 and synchronized each other in the movement in a known manner by way of known type devices, and that, preferably, an operator per side is positioned, respectively, at the inlet mouth 21 and at the outlet mouth 23 of the oven 12, according to the first embodiment, or only at the inlet mouth 21, according to the second embodiment.

According to the disclosed embodiments it is provided that the lateral catenaries 18 and that the belt 22 move by alternating motion, for example by alternating a forward movement of predetermined length to a stop of predetermined time length after each forward movement.

In particular, each predetermined forward movement can be comprised between 150-300 mm, depending on the characteristics of the catenaries, and each stop can be comprised between 15-30 seconds according to the period of time foreseen to hook or unhook the paper 2 to/from the respective hooking/unhooking components 50.

Once the initial steps have been completed, it is provided that in a first operating step or hooking step the objects 8 previously wrapped in the paper 2 reach the inlet mouth 21 of the oven 12 and that each operator on each side, during a stop of predetermined length, will actuates, if necessary, the actuator 58 by way of the pedal 59, wraps the paper 2 to the inner shell 52 protruding from the outer shell, and re-actuates the lever 58*a* to the rest position, by actuating the same pedal 59 or another pedal, so that it is granted that the paper 2 is hooked between the inner shell 52 and the outer shell 53.

In this hooking step it is provided that the respective hooking/unhooking or sucker components 50 are located, in a known way, near the actuators 58, for example aligned on a vertical plane, thanks to the presence of optical components or micro-switches of known type.

In a second operating step or movement step it is provided that the catenaries 18 are moved and that the suction components 45 automatically enter, during the movement, in the respective sealing gaskets 43. The insertion involves that, by suction, the paper 2 is adhered to the object 8 for a time necessary for sublimation, i.e. until the objects 8 wrapped by the paper 2 are held inside the oven 12.

In this step, in the path inside the oven 12, the images are transferred by sublimation onto the objects 8. Naturally, in this step, suction through the lenses 45 is always active since the lenses remain permanently inserted in the sealing gaskets 43 along the path from the inlet mouth 21 to the outlet mouth 23 of the oven 12.

At the end of the path of the objects 8 wrapped into the paper 2 along the oven 12, in a third step or unhooking step, for instance according to the first embodiment, two further operators located on the sides of the outlet mouth 23, provide, similarly to what has been disclosed about the hooking step, to activate, for example by way of the pedal 59, the actuator 58 to make the inner shell 52 protrude from the outer shell 53 and provide to unload the object 8 wrapped by the paper 2 from the hooking/unhooking components or suckers 50.

According to the second embodiment, it is provided that in the third step, the protrusion of the inner shell 52 is completely automatic and that the object wrapped into the paper 2 is unhooked and transported outside the oven on the belt 22, in a completely automatic way.

Advantageously, the system 10 allows to optimize the use of the oven 12 because, in use, the “hot” zone only comprises parts that require to be heated to effect the transfer of images by sublimation on the objects 8.

Moreover, the system as described advantageously allows to use gaskets and catenaries made with materials that must sustain temperatures much lower than those of sublimation. The system thus allows to avoid the use of materials resistant to high temperatures, for example higher than 260° degrees and to limit heat dispersion on components, devices or groups that do not require to participate to the sublimation process.

The hooking/unhooking devices 15, if they comprise the actuators, make it possible to avoid, in particular in accordance with the first embodiment, that the operators must use protections resistant to high temperatures since hooking and unhooking are controlled by actuators driven from outside the “hot” zone.

The system has been disclosed by taking as an example the transfer of graphical images on preferably elongated objects.

Naturally, according to further embodiments, the objects can be of any shape that can be hooked/unhooked by way of at least one hooking/unhooking device, as exemplified.

According to a further possible embodiment, the system can comprise a single catenary, a single suction unit, a single row of hooking/unhooking devices and one movable sheet laterally located at one side the oven.

According to this possible embodiment, the handling device can be configured to change the width dimensions of the “hot” zone of the oven in an asymmetrical way by comprising and moving the only one movable sheet without thereby going beyond the scope of what has been described and claimed.

Of course, obvious changes and/or variations to the above disclosure are possible, as regards shapes, components, and connections, as well as details of the disclosed construction and operation method without departing from the invention as specified by the claims that follow.

The invention claimed is:

1. A system configured to transfer by sublimation graphical images on objects wrapped by transfer supports, comprising an horizontal oven comprising an inlet mouth and an outlet mouth and a belt for transporting said objects, a suction unit located along at least one side of the oven, a plurality of hooking/unhooking components located along the a side of the oven and configured to hook/unhook the objects wrapped by the transfer supports, a catenary located along the side of the oven and configured to move said objects wrapped by the transfer supports from said inlet mouth to said outlet mouth by way of said hooking/unhooking components, a separating wall configured to keep separate a “hot zone”, wherein the oven is working and the hooking/unhooking components are provided, from a “cold zone”, wherein the oven is not working and the at least one the catenary and the suction unit are provided, wherein said system further comprises a handling device configured to move said suction unit, said catenary and said plurality of hooking/unhooking components transversally to said inlet mouth, to said outlet mouth, and to said belt of the oven whereby said separating wall keeps the “hot zone” separate from the “cold zone” as a function of the size of the objects wrapped by the transfer supports, and a movable sheet, in a lower area of the oven, connected to the handling device and configured to be moved by the handling device so as to dimension the “hot zone” as a function of the size of the objects wrapped by the transfer supports.

2. The system according to claim 1, wherein said separating wall comprises vertical arms facing each other and configured so as to comprise a vertical gap configured to allow a way through of hollow tubular elements configured to connect the hooking/unhooking components to the catenary and to the suction unit.

3. The system according to claim 1, wherein said oven comprises one or more pipes configured-to convey hot air to the lower area of the oven below the belt configured to transport the objects wrapped by the transfer supports into the “hot zone”.

4. The system according to claim 1, wherein said suction unit, comprised in the “cold zone”, comprises a hollow elongated component connectable to a vacuum source and comprising on two converging sides respective strips made of deformable material and comprising contacting ends configured to shape a sealing gasket, said deformable material being comprised in said “cold zone” and being of a type resistant to temperatures lower than those of sublimation.

5. The system according to claim 4, wherein said sealing gasket is configured to be elastically deformed by a plurality of suction components, said suction components comprising a frontal area comprising one or more suction holes and configured to automatically enter between said strips made of deformable material, a rear area connected to the frontal area and linked to a respective hooking/unhooking component of said plurality of hooking/unhooking components.

6. The system according to claim 1, wherein each of said hooking/unhooking components comprises a spring configured to provide a telescopic movement of an inner shell as to an outer shell of said hooking/unhooking component, and wherein said system comprises, located near said inlet mouth and said outlet mouth, actuators configured to activate hooking or unhooking of the objects wrapped by the transfer supports to/from the hooking/unhooking components by way of respective levers remotely controlled and configured to exert a pressure on said spring to provide the movement of said inner shell as to said outer shell.

7. The system according to claim 1, wherein said catenary is placed on a horizontal or substantially horizontal plane.

8. The system according to claim 7, wherein said handling device, comprises sliding supports hooked to "U shaped" and "inverted U shaped" configured to realize said separating wall, and wherein said "U shaped" and "inverted U shaped" elements are configured to support said suction unit and said catenary, whereby said handling device is configured to also move said separating wall.

9. The system according to claim 7, wherein located at said outlet mouth, said system comprises actuators configured to activate the movement of the outer shell with respect to the inner shell and release of the objects wrapped by the paper from the hooking/unhooking components, and rotatable supports connected to said catenary and configured to make rotate said catenary around a vertical or substantially vertical axis, whereby said actuators are configured to cooperate with said rotatable supports so as to maintain said outer shell moved as to said inner shell and perform an automatic release of said objects wrapped by said transfer supports thanks to the rotation movement of said catenary placed on the horizontal or substantially horizontal plane.

10. A process for manufacturing a system configured to transfer by sublimation graphical images from transfer supports to objects, comprising the steps of providing a horizontal oven comprising an inlet mouth, an outlet mouth and a belt for transporting said objects, said horizontal oven being configured to operate so as to carry out the transfer of the graphical images to the objects by sublimation, providing suction unit located along side of the oven, providing a plurality of hooking/unhooking components located along the of the oven and configured to hook/unhook the objects wrapped by the transfer supports, providing catenary located along the side of the oven and configured to move, by way of said hooking/unhooking components and of said belt, the objects wrapped by the transfer supports from said inlet mouth to said outlet mouth of the oven, providing a separating wall configured to keep separate a "hot zone", wherein the oven is working and the hooking/unhooking components are provided, from a "cold zone", wherein the oven is not working and the catenary and the suction unit are provided, providing a handling device arranged to move said suction unit, said catenary and said plurality of hooking/unhooking components transversally to said inlet mouth, to said outlet mouth and to said belt, and providing movable sheet, in a lower area of the oven, connected to the handling device and arranged to be moved by the handling device so as to dimension the "hot zone" according to the size of the objects wrapped by the transfer supports.

11. The process according to claim 10, wherein said step of providing said separating wall comprises the further step of providing vertical arms facing each other and configured so as to comprise a vertical gap, said vertical arms being configured to separate the "hot zone" from the "cold zone".

12. The method according to claim 10, wherein said step of providing said oven comprises the further steps of providing one or more pipes configured to convey hot air to the lower area of the oven, below the at least one movable sheets and below the belt supporting the objects wrapped by the transfer supports.

13. The process according to claim 10, wherein said step of providing said suction unit comprises the further steps of providing a hollow elongated component connectable to a vacuum source, providing on two converging sides of said hollow elongated component respective strips made of deformable material and comprising contacting ends, making a sealing gasket by way of said strips made of deformable material, said deformable material being of a type that maintains elastic characteristics at limited temperatures but cannot maintain elastic characteristics at sublimation temperatures.

14. The method according to claim 10, wherein said step of providing a catenary comprises the step of providing a catenary placed on a horizontal or substantially horizontal plane.

15. The system according to claim 2, wherein said suction unit, wherein the "cold zone", comprises a hollow elongated component connectable to a vacuum source and comprising on two converging sides, respective strips made of deformable material and comprising contacting ends configured to shape a sealing gasket, said deformable material being in said "cold zone" and being of a type resistant to temperatures lower than those of sublimation.

16. The system according to claim 2, wherein each of said hooking/unhooking components comprises a spring configured to provide a telescopic movement of an inner shell as to an outer shell of said hooking/unhooking component, and wherein said system comprises, located near said inlet mouth and said outlet mouth, actuators configured to activate hooking or unhooking of the objects wrapped by the transfer supports to/from the hooking/unhooking components by way of respective levers remotely controlled and configured to exert a pressure on said spring to provide the movement of said inner shell as to said outer shell.

17. The system according to claim 2, wherein said catenary is placed on a horizontal or substantially horizontal plane.

18. The system according to claim 8, wherein located at said outlet mouth, said system comprises actuators configured to activate the movement of the outer shell with respect to the inner shell and release of the objects wrapped by the paper from the hooking/unhooking components, and rotatable supports connected to said catenary and configured to make rotate said catenary around a vertical or substantially vertical axis, whereby said actuators are configured to cooperate with said rotatable supports so as to maintain said outer shell moved as to said inner shell and perform an automatic release of said objects wrapped by said transfer supports thanks to the rotation movement of said catenary located on the horizontal or substantially horizontal plane.

19. The process according to claim 11, wherein said step of providing said suction unit comprises the further steps of providing a hollow elongated component connectable to a vacuum source, providing on two converging sides of said hollow elongated component respective strips made of deformable material and comprising contacting ends, making a sealing gasket by way of said strips made of deformable material, said deformable material being of a type that maintains elastic characteristics at limited temperatures but cannot maintain elastic characteristics at sublimation temperatures.

20. The process according to claim 11, wherein said step of providing a catenary comprises the step of providing a catenary placed on a horizontal or substantially horizontal plane.

* * * * *